United States Patent
Verhaeghe

(10) Patent No.: US 8,448,989 B2
(45) Date of Patent: May 28, 2013

(54) COMPOSITE TRAILER

(75) Inventor: Jan Verhaeghe, Beveren (BE)

(73) Assignee: Groep Stevens International (BE)

( * ) Notice: Subject to any disclaimer, the term of this patent is extended or adjusted under 35 U.S.C. 154(b) by 606 days.

(21) Appl. No.: 12/441,394

(22) PCT Filed: Sep. 14, 2007

(86) PCT No.: PCT/EP2007/059742
§ 371 (c)(1),
(2), (4) Date: Dec. 11, 2009

(87) PCT Pub. No.: WO2008/031900
PCT Pub. Date: Mar. 20, 2008

(65) Prior Publication Data
US 2010/0090452 A1  Apr. 15, 2010

(30) Foreign Application Priority Data
Sep. 15, 2006  (EP) .................................... 06120783

(51) Int. Cl.
*B62D 63/06* (2006.01)
(52) U.S. Cl.
USPC .......................................... 280/789; 280/400

(58) Field of Classification Search
USPC ................................................. 280/789, 400
See application file for complete search history.

(56) References Cited

U.S. PATENT DOCUMENTS
2003/0184074 A1  10/2003  Verhaeghe

FOREIGN PATENT DOCUMENTS
| DE | 19814792 | 10/1999 |
| DE | 202004020470 | 6/2005 |
| WO | WO 2004088160 | 10/2004 |
| WO | WO 2006117395 | 11/2006 |

*Primary Examiner* — Eric Culbreth
(74) *Attorney, Agent, or Firm* — Thomas G. Peterson; Bradley Arant Boult Cummings LLP

(57) ABSTRACT

The present invention relates to a trailer comprising a trailer bed which is at least 5 partly made of a composite material and at least one axle which extends in cross direction of the trailer and is connected to the trailer bed for suspending the wheels. The trailer bed comprises an upper and a lower load absorbing surface, wherein the upper load absorbing surface comprises in longitudinal direction a front and a back area and a connection area between them. Between the upper 10 and lower load absorbing surface, at least one reinforcing member is mounted which is resilient and which is provided to function as a support for the upper load absorbing surface in a loaded state of the upper load absorbing surface.

14 Claims, 2 Drawing Sheets

COMPOSITE TRAILER

CROSS REFERENCE TO RELATED APPLICATION

This application is the entry into the United States of International Application no. PCT/EP2007/059742 filed Sep. 14, 2007 and claims priority from European Application No. 06120783.3 filed Sep. 15, 2006, the entirety of each of which are hereby incorporated by reference.

BACKGROUND OF THE INVENTION

The present invention relates to a trailer comprising a trailer bed and at least one axle which extends in cross direction of the trailer and is connected to the trailer bed for suspending the wheels.

Trucking has become one of the most important modes of transportation for goods. The inherent design of a towed trailer is long in length and narrow in width, with a kingpin and fifth wheel system or a kingpin and gooseneck hitch mechanism for connecting the trailer to the towing truck. The main bearing members for loads placed on vehicles, such as for instance flatbed or semi-trailers, are a pair of main runners which are usually made of steel and run longitudinally of the vehicle. Support for a load carried by the trailer is offered by cross members mounted to the bottom side of the undercarriage. These cross members are bolted or welded perpendicularly to the webs of the main runners and define the width of the bed of the trailer. On top of the structure formed by the longitudinal and cross members, usually a floor is provided. The floor often comprises multiple floor sections which are welded to each other along their longitudinal sides or butted against each other and held in position by special guiding means and floor screws.

From WO-A-9947406 a flatbed trailer is known that unitizes the floor, the longitudinal runners and the cross runners, to provide a. lightweight, though strong trailer. However, extensive welding of the cross members and floor sections to the main runner, which extends over the whole length of the loading floor, not only reduces the load bearing strength of the complete floor structure and the loading capacity but also adds considerable weight, and therefore requires a substantial sacrifice in load capacity. Even when materials such as for instance low density aluminum are used to increase load capacity, this attempt is defeated by the extensive welding, which is time consuming and costly, and tends to minimize payload. Moreover, since the floor is built of essentially loose floor sections, they contribute very little to the load bearing function.

EP-A-967.139 discloses a semi-trailer with a wheeled lightweight chassis, which comprises a pair of spaced-apart longitudinal runners, which extend over the entire length of the trailer. At the front portion, the chassis runners are bow shaped and they extend around the ends of a forward transverse runner. The runners taper inwardly towards the rear chassis portion, to finally run parallel, three wheel axle assemblies being mounted between them in the rear chassis portion. The runners also taper inwardly towards the front portion, so that the rubbing plate assembly can be directly mounted to the runners without the need for additional reinforcement, thus saving weight. The semi-trailer disclosed in EP-A-967.139 is suitable for use with a goose-neck as well as flat construction at its front end. However, it is made of metal and does not comprise a trailer floor.

SUMMARY OF THE INVENTION

Over the years, in the transport industry several attempts have been made to decrease the empty chassis weight as much as possible. As the European legal limit of the total weight of a truck is 40 ton, reducing the weight of the trailer would permit increasing the load capacity. One attempt includes a partial substitution of metal parts by composite parts. However, this is insufficiently cost effective. Besides this, mixing metal parts and composite components in a trailer is always penalized by breaking of the metal parts as these are subjected to high dynamic loads and to widely varying temperatures when in use. The metal parts need to be repaired and re-welded on a regular basis.

It is therefore an object of the present invention to provide a trailer which is virtually fully made of composite material.

This is achieved according to the present invention with the technical features of the trailer described hereunder.

Thereto the trailer of this invention is characterized in that the trailer bed comprises an upper and a lower load absorbing surface, wherein at least one of the upper and lower load absorbing surface comprises a composite material, wherein the upper load absorbing surface comprises in longitudinal direction a front and a back area and at least one connection area between the front and back area, the upper load absorbing surface being connected to the lower load absorbing surface at the position of the connection area, wherein the lower load absorbing surface comprises in longitudinal direction a first part in a front area of the lower load absorbing surface, which first part is connected with a first end part to the upper load absorbing surface at the position of the at least one connection area and which slants from the connection towards the back area;

wherein the lower load absorbing surface further comprises a second part which extends from the first part and runs along the upper load absorbing surface and extends towards the back area thereof;

wherein the second part of the lower load absorbing surface is connected to the upper load absorbing surface on at least one connection position;

wherein at least one axle is connected to the lower load absorbing surface; opposite end parts of the axle extending from the lower load absorbing surface in cross direction thereof and providing a connection for suspending a wheel.

Because the trailer is towed from a front part and because the upper and lower load absorbing surfaces are connected to each other, the lower surface follows the displacement of the upper surface. To achieve this, it is sufficient that the upper and lower load absorbing surfaces are firmly connected to each other in a front part of the lower surface only. As at least one of both parts is made of a composite material, torsion exerted to the trailer bed is absorbed by and within the composite material as such, with minimum risk to permanent deformation of the material and minimum risk to canting of the trailer, It is well known to the person skilled in the art that the trailer bed may be subjected to substantive torsion. when driving over damaged and./or curved roads. With metal parts, local forces exerted to the metal parts as well as the occurrence of torsion often involve de-tracking of the trailer especially when carrying high loads, with a risk to permanent deformation of the metal parts and the occurrence of accidents, In the trailer of the present invention to the contrary, locally occurring forces as well as torsion may be locally absorbed by the composite material, and dampened within the remainder of the material itself, without the need to provide dedicated suspension members or torsion absorbing members. The material of the trailer functions as a suspension member and as a body which is capable of absorbing locally occurring forces or torsion. As a consequence, the risk to de-tracking of the trailer is minimized and a trailer with high road stability is provided.

The inventor has found that besides functioning as a force and torsion absorption member, the composite material as such has a damping effect with respect to vibrations sensed by the trailer bed and is capable of absorbing within the material the vibrations to which the trailer bed is exposed. This absorption of vibration extends to vibrations occurring in any direction, i.e. as well in height, longitudinal or cross direction or any other direction. The ability of absorbing vibrations occurring in height direction of the trailer is particularly advantageous as the use of shock absorbers can be dispensed with.

In a preferred embodiment of the invention, at least one of, but preferably both the upper and lower load absorbing surface are made of composite material. They may however also be made of any other material which is capable of absorbing locally occurring vibrations, forces and torsion within the material itself. Preferably the composite material comprises at least one composite laminate which comprises at least an upper and a lower layer of fibrous reinforcing material which sandwich between them at least one layer of a low density material, the upper and lower layer of fibrous reinforcing material and the low density material being connected to each other by means of fibres which extend in height direction of the laminate The laminate is preferably impregnated with a resin. The low density material is preferably a polymer foam or a honeycomb material. This way the weight of the trailer can be kept as low as possible, while maximum strength is ensured.

In another preferred embodiment of this invention, the lower load absorbing surface comprises a lower and upper laminate which sandwich between them a honeycomb material, each of the upper and lower laminate comprising an upper and lower layer of fibrous reinforcing material which sandwich between them a layer of a polymer foam, the upper and lower layer of fibrous reinforcing material and foam being connected to each other by means of a fibrous reinforcing material which extends in height direction of the panel, the laminate being impregnated with a resin. The presence of the honeycomb material permits maintaining virtually the same thickness over the whole length of the lower load absorbing surface, even at the position of the axles.

Within the scope of the present invention use can be made of an axle for suspending the wheels, which is made of any material considered suitable by the person skilled in the art. Although for example metal axles may be used, preferably the at least one axle is made of composite material. As the axles are made of a fibrous reinforced composite material, torsion exerted to the axles when driving over roads which are uneven or damaged in cross or longitudinal direction and when driving over curved roads, or unequal braking forces between left and right sides of the trailer, may be at least partly absorbed within the material of the axle, at minimum risk to deformation of the axle. The connection between the axle and the trailer bed ensures that both parts act as one torsion and vibration absorbing unity, whereby direct and optimum transfer thereof from the axles towards the trailer had is ensured, thus improving the road stability of the trailer.

Preferably the axles are connected to the lower load absorbing surface over a substantial part of their length, in cross direction of the lower load absorbing surface. This way a large contact area between the axles and the load absorbing surface is provided, which guarantees optimum torsion and vibration transfer as well as absorption thereof in a similar manner both by the axle and the trailer bed.

It is further preferred that between the upper and lower load absorbing surface at least one reinforcing member is mounted, which is resilient in height direction of the trailer bed and which is provided to function as a support for the upper load absorbing surface in a loaded state of the upper load absorbing surface.

The at least one reinforcing member is preferably a member made of composite material which is received within the space between the upper and lower load absorbing surface, opposite end parts of the reinforcing member being fastened to the lower load absorbing surface, a part of the reinforcing member between the opposite end parts being resilient in height direction of the trailer bed and being provided to support the upper load absorbing surface in a loaded state thereof. The presence of the resilient members assists in absorbing the vibrations at the positions where they are sensed most by the trailer, i.e. at the position of the wheels.

BRIEF DESCRIPTION OF THE DRAWINGS

The invention is further elucidated in the appending figures and description of the figures.

DETAILED DESCRIPTION

Figure 1:
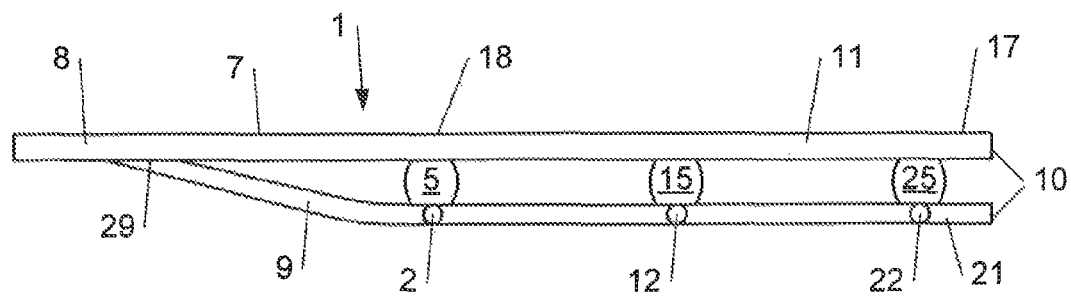
FIG. 1 shows a cross section of the trailer of the present invention in longitudinal direction thereof.

The trailer 1 shown in FIG. 1 comprises a trailer bed 10 which is at least partly made of a composite material. The trailer bed comprises at least an upper 11 and a lower 21 load absorbing surface. If so desired to achieve particular load capacity and torsion and vibration absorption abilities, further load absorbing surfaces may be added.

The upper and lower load absorbing surface preferably take the form of a panel or plate which extends in longitudinal and cross direction of the trailer. Preferably at least one of them is made of a composite material, which may be any composite material considered suitable by the person skilled in the art. More preferably both panels are made of composite material. However one of the upper and lower load absorbing surface may also be made of any other material considered suitable by the person skilled in the art. For example one of them may be made of a metal with vibration and torsion properties.

The upper and lower load absorbing surface may be made as one part or in two separate parts, which are fastened to each other after having been produced and shaped separately. Preferably however, each of the upper and lower load absorbing surface comprise at least one composite laminate comprising at least an upper and a lower layer of fibrous reinforcing material which sandwich between them at least one layer of a low density material. The upper and lower layer of fibrous reinforcing material and the low density material are connected to each other by means of fibres which extend in height direction of the laminate. The connection may be established using any technique considered suitable by the person skilled in the art, such as for example stitching or tufting using continuous fibrous material, the latter being preferred. The substantially continuous fibrous tufting material use can be made of fibrous materials in the form of tows, threads, bundles, yarns or rovings, comprise a plurality of fibre bundles or twined or torsioned fibres, which may be built up of a single material or a combination of two or more different materials. The angle under which twined fibres extend with respect to each other will be adapted taking into account the envisaged compressive strength. The nature of the fibrous material used is not critical to the invention, and may be selected from natural fibres, for example metal fibres, mineral fibres, glass fibres, carbon fibres, wool, cotton, flax etc; or synthetic fibres, for example polyester, polypropylene, polyethylene, polyamide, or mixtures of two or more of these fibres, However, because of its high impact strength the use of aramid fibres is preferred.

Within the scope of the present invention, the upper and lower load absorbing surface are preferably made of a reinforced sandwich structure such as the material disclosed in PCT/BE2005/000075. Preferably the core material comprises stacked in height direction thereof, at least one top layer or sheet and at least one bottom layer or sheet of a fibrous reinforcing material, which sandwich between them at least one core of a foamed material. The core material of the load absorbing surface may be made of metal, foamed metal, fibrous reinforced plastic material, plastic material or foamed plastic material. Mostly use will be made of a foamed plastic material, for example foamed polyethylene, polypropylene, polyurethane, ethylene-propylene copolymer. The core may also comprises a first and a second foam layer stacked on top of each other which sandwich between them one or more layers or layers of a fibrous reinforcing material.

The top and bottom layer or sheet of fibrous reinforcing material will mostly be made of a sheet, a fabric or mat of a fibrous reinforcing material, which may be pre-impregnated with a thermoplastic or thermosetting resin or not, which may be a woven or non-woven product. The material of which the top and bottom layer are made may be the same or different. It is however also possible to apply to each side of the core two or more fabrics or mats, which may be made of the same or a different material. It is further possible to have one or more of the face sheets built up of alternating first and second materials, for example alternating glass fibre mats and mats comprising a mixture of glass fibre and metal fibre. However, such a fibrous reinforcing material may also be present at a more central position of the laminate.

At the positions of the trailer where a high risk exists to the occurrence of torsion, vibrations and other forces, the composite laminate may be locally reinforced by the presence of at least one insert of a reinforcing material within the laminate, preferably within the core material. Thereby the at least insert preferably extends over at least part of the height of the core and in at least one of the longitudinal and transversal direction thereof. The sandwich structure may comprise a single or a plurality of inserts arranged in transverse and/or longitudinal direction of the reinforced sandwich structure. The insert may be made of a wide variety of materials considered suitable by the person skilled in the art, but preferably comprises a core material chosen from the group of metal, foamed metal, fibrous reinforced plastic material, plastic material or foamed plastic material comprising and/or enveloped in a fibrous reinforcing material. Suitable examples include a strip, a plate, a net or a layer made of metal, steel, stainless steel, aluminum or iron or a combination of two or more of these materials. If so desired, the insert may be enveloped by means of substantially continuous tufted reinforcing fibers. The inserts may take various positions within the composite laminate depending on the envisaged reinforcement. They may for example slant with respect to the longitudinal and/or transverse direction of the reinforced sandwich structure, they may extend substantially parallel to each other, be arranged in a staggered arrangement in transverse and/or longitudinal direction of the structure or be arranged to form a honeycomb-like pattern in the core.

The sandwich structure is impregnated with a resin material, and thereafter hardened. The process of pultrusion is preferred over the conventional moulding as it is a suitable technique for producing composite laminate panels with large dimensions, in particular a long, length. The panels can be fed through the pultrusion device in a continuous manner. The use of a mould for shaping the product can be dispensed with.

As can also be seen from the cross section of the trailer shown in FIG. 1, the upper load absorbing surface 11 comprises in longitudinal direction a front and a back area 8, 18 and at least one connection area 7 between them. The connection area corresponds to a surface area where a bottom face of the upper load absorbing surface 11 is connected to the lower load absorbing surface 21. Such a direct connection between the top face of the lower panel and the bottom face of the upper panel may be provided in a front and an end part of the trailer bed, or in a front part only as is shown in FIG. 1. The connection may be achieved using any technique for connecting composite materials, which is considered suitable by the person skilled in the art, for example gluing or welding, tufting or stitching or any other suitable technique, in particular in case the upper or lower load absorbing surface are made of a different material for example mechanical connection may be preferred. The front area 8 will usually contain connecting means for connecting the trailer to a towing vehicle. It is particularly preferred that the lower load absorbing surface 21 comprises in longitudinal direction a first part 9 which is bent with respect to the upper load absorbing surface and which is connected with a first end 29 part to the bottom face of the upper load absorbing surface 11.

The lower load absorbing surface further comprises a second part 19 which extends from the first part along the upper load absorbing surface towards the back area thereof.

Figure 2:
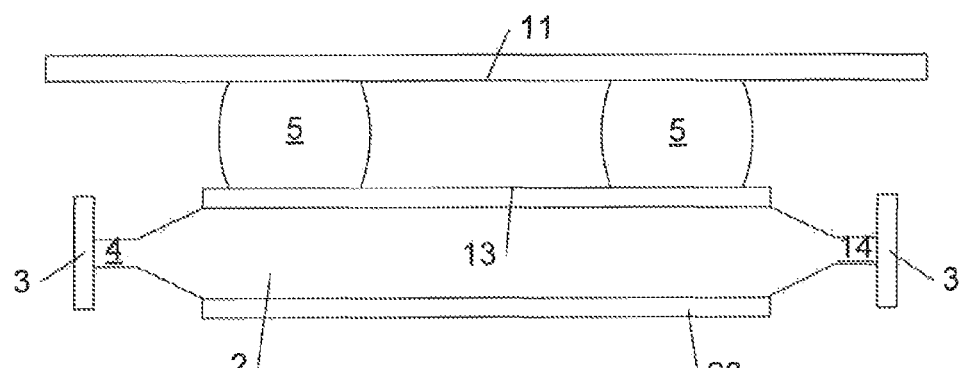
FIG. 2 shows a cross section of the trailer of the present invention in cross direction thereof, at the position of the axles.

With the construction shown in FIGS. 1 and 2, a significant amount of space is left between the upper and lower load absorbing surface, which is suitable for use as additional storage space. Because low weight composite material is used, and because the nature of the construction of the trailer bed, wherein an at least partly empty space is present between the upper and lower panel 11, 21, the load capacity of the trailer bed can be significantly increased.

Preferably, in the empty space between the upper and lower load absorbing surface, at least one reinforcing member 5, 15, 25 is mounted which is resilient and which is provided to function as a support for the upper load absorbing surface in a loaded state of the upper load absorbing surface. The reinforcing member may be connected to both the upper and lower load absorbing surface or to one of them only. The reinforcing member may for example take the shape of a panel, which is bent in longitudinal direction of the trailer, opposite end parts respectively at the front and end part of the trailer bed being connected to the lower load absorbing surface. In that case, usually a central part of the upper load absorbing surface is supported by the bent panel, when loaded. The panel may be made of a composite material such as the one described above. However, if so desired also a bent metal panel may be used or a bent panel of any other suitable material.

According to another embodiment, the reinforcing member comprises a plurality of spacers 5, 15, 25 positioned spaced apart from each other in longitudinal direction of the trailer bed, The spacers are reversibly compressible and expandable in height direction of the trailer bed, Preferably a top part of each spacer is fastened to a bottom face of the upper load absorbing surface and a bottom part of each spacer is fastened to a top face of the lower load absorbing surface. The trailer bed 10 further comprises at least one axle 2, 12, 22. The axles extend in cross direction of the trailer bed, their opposite end parts 4, 14 preferably protruding from the longitudinal sides of the lower load absorbing surface 21 to provide a suspension for the wheels. Each axle is connected to the lower load absorbing surface 21. The spacers 5, 15, 25 are preferably provided at the position of the axles 2, 12, 22 to permit absorbing vibrations and forces at the location where they occur.

By mounting the axles 2, 12, 22 in the lower load absorbing surface 21, an all-in-one trailer is provided, in which the floor for carrying the load and the undercarriage may be made as one part. This has several advantages over the prior art where the undercarriage was usually made as a separate part, which had to be mounted to the load carrying floor. In particular, by having the undercarriage and floor made in one part, a trailer may be obtained with an improved stiffness, in which an improved transfer of forces from the wheels towards the upper part of the floor may take place, without involving substantial bending or deformation of the trailer. Since the trailer floor and undercarriage are made in one part, they can act as one unity within which optimum force transfer may take place. Force absorption may be optimized by providing local reinforcing inserts described above.

If so desired, the lower load absorbing surface 21 may also be releasably connected to the upper load absorbing surface 11. To establish the releasable connection, any connecting means considered suitable by the person skilled in the art may be used.

At the position between the connection area 7 and the end part 17 of the trailer, the upper and lower load absorbing surface 11, 21 may however be connected to each other at several positions, to minimize the risk to de-tracking of the upper and lower load absorbing surface 11, 21, Thereto, any suitable connection may be used, However, preferably use is made of a plurality of spacers 5, 15, 25, positioned at a distance from each other between the connection area 7 and the end part of the trailer 17, thus in longitudinal direction of the trailer, In cross direction of the trailer, one single spacer may be used, or two or more adjacent spacers, depending on the dimensions of the trailer and spacers and the expected load. The number of spacers used is not critical to the invention and the person skilled in the art will be capable of establishing the required number taking into account the envisaged use, load capacity of the trailer. The distance between the spacers 5, 15, 25 is not critical to the invention either; the distance between subsequent spacers may the same or different. However, the spacers are preferably positioned at a position corresponding to the position of the axles and wheels, as at this position the occurrence of vibrations and torsion forces will be higher and optimum transfer of those towards the entirety of the trailer is preferred to provide optimum absorption thereof and to guarantee optimum road stability.

Within the framework of the present invention the spacer may take any form and may be made of any material considered suitable by the person skilled in the art. However, preferred is the spacer which is a resilient member, which is reversibly compressible and expandable in height direction of the trailer. This way the functions of the springs and shock absorbers are integrated within the trailer. Preferably a spacer is mounted at a position corresponding to the position of an axle, on both opposite longitudinal sides of the trailer (FIG. 2) since at the position of the wheels the occurrence of vibrations will be the most important. If so desired, additional spacers may be added between at positions between the axles. The spacer may extend in cross direction of the trailer and may have a width which is smaller than or virtually equal to the width of the trailer. If so desired, two spacers may be positioned adjacent to each other in cross direction of the trailer, along a line which runs parallel to the axle as is shown in FIG. 2. The person skilled in the art will be capable of selecting the required dimensions taking into account the envisaged use of the trailer.

The spacer used in the trailer of the present invention may be any spacer considered suitable by the person skilled in the art. The preferred spacer is a cylinder made of composite material. Another preferred spacer is an air spring. An example of a spacer made of composite material includes the fluid accumulator disclosed in PCT/BE03/00077, which is hereby incorporated by reference. The fluid accumulater disclosed therein comprises a wall surrounding a reservoir for receiving the fluid. Part of the wall is elastically deformable, and contains a first wall portion made of a first elastically deformable composite material, with fibrous reinforcement material applied in a first density, and a second wall portion that is made of a second composite material with fibrous reinforcement material applied in a second density, and an elastic deformability that is the same as or is different from the elastic deformability of the first wall portion, the density of the fibrous reinforcement material in the first and second wall portions being different from each other. If so desired, the plastic material of the first and second wall portion may be materials with a different elastic deformability. To permit controlling the elasticity, the fibres of the fibrous reinforcement material in the first and second wall portion are orientated at different angles with respect to the longitudinal axis of the reservoir. Suitable reinforcing fibres include glass fibres, carbon fibres or polyester fibres, preferably aramid fibres. Suitable plastic materials include vinylester resins. Preferably between the first and second end wall of the cylinder a piston is provided which is movable to and from the second end wall. The wall of the fluid accumulator may be manufactured by filament winding, braiding, a combination of filament winding and pultrusion, pullwinding, a combination of braiding and pultrusion.

The axle used within the trailer of the present invention may be made of any material considered suitable by the person skilled in the art, for example metal or composite material. The use of composite material is preferred. More preferably use is made of an axle which comprises a stiff mandrel of composite material, which has been subjected to filament winding as this has a significantly improved resistance to fatigue failure. The preferred "building block" for such a mandrel is a three dimensional fibrous reinforced panel such as disclosed in PCT/BE03/00092, which is hereby incorporated by reference. The sandwich panel disclosed in PCT/BE03/00092 is preferred as it is stiff, strong, light and may be produced with an economically feasible process. If so desired, multiple panels can be bonded on top of each other in order to create a multilayered super-sandwich consisting of individual sandwich panels, which are connected together and shaped into the envisaged shape. This shaping process can occur with simple tools, for example by means of cutting. Following the shaping, the mandrel is over-wound with continuous fibers of fibrous reinforcing material, preferably by using filament winding. However, braiding, hand and automated tape and roving deposition processes may also be used.

Suitable fibers for over-wrapping the mandrel include, but are not limited to mineral fibers for example glass-fibers, synthetic fibers for example Kevlar-fibers and carbon-fibers. Within the framework of the present invention it is however also possible to over-wrap with hybrid combinations of fibers such as for example glass-fiber and Kevlar. The over-wrap angles (plus alpha and minus alpha) can be chosen and varied along the length of the axle such that the overall stiffness of the axle is tailored for the desired application. After having been over-wrapped with fibrous reinforcing material, the thus obtained axle is over-wrapped with an amount of at least one resin, for example a vinylester resin, a polyester or an epoxy resin and the ester is cured. However any other suitable resin known to the person skilled in the art may be used.

Composites technology can be used to create an axle provided that use is made of a mandrel which does not need to be removed after the process. However, the person skilled in the art will usually use low-cost mandrel materials such as cardboard, foam, or wood for parts which are not critical and do not have close dimensional tolerances. Other materials used for mandrels are: dissolvable materials (i.e. eutectic salts, low temperature melting alloys, etc. . . . ); water soluble mandrels (i.e PVA (Polyvinyl alcohol) and sodium silicate, etc.); PVA sand mixtures; Sodium silicate mixtures; Plaster; Segmented mandrels; Inflatable rubber or elastomeric mandrels.

The axle 2, 12, 22 is preferably mounted within the material of the lower load absorbing surface 21. Connection of the material of the axle to the material of the lower load absorbing surface may be established in any way considered suitable by the person skilled in the art, for example glueing, welding, mechanical connection.

Figure 3:
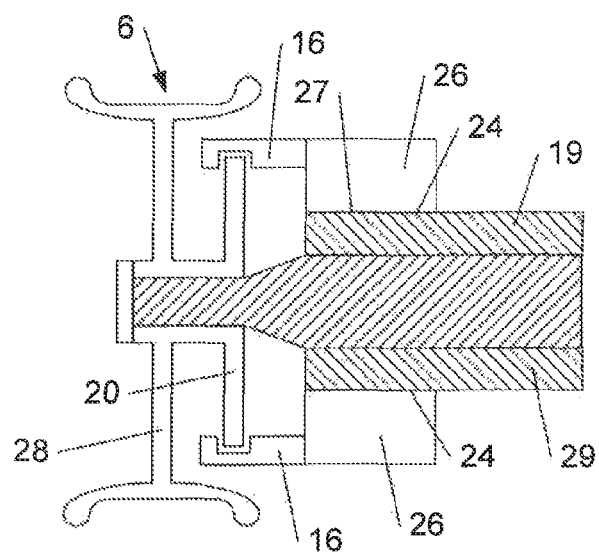
FIG. 3 shows a cross section of the trailer of the present invention in cross direction thereof, at the position of the axles and wheels, with the brake system.
Figure 4:
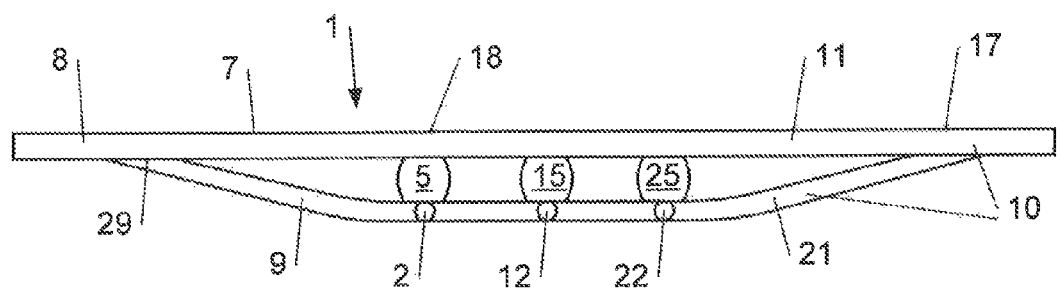
FIG. 4 schematically shows a cross section of the trailer of the present invention in longitudinal direction thereof, wherein the second part is connected to the upper load absorbing surface at a position which corresponds to the back area of the upper load absorbing surface, by means of a connection part which slants with respect to the upper load absorbing surface.
Figure 5:
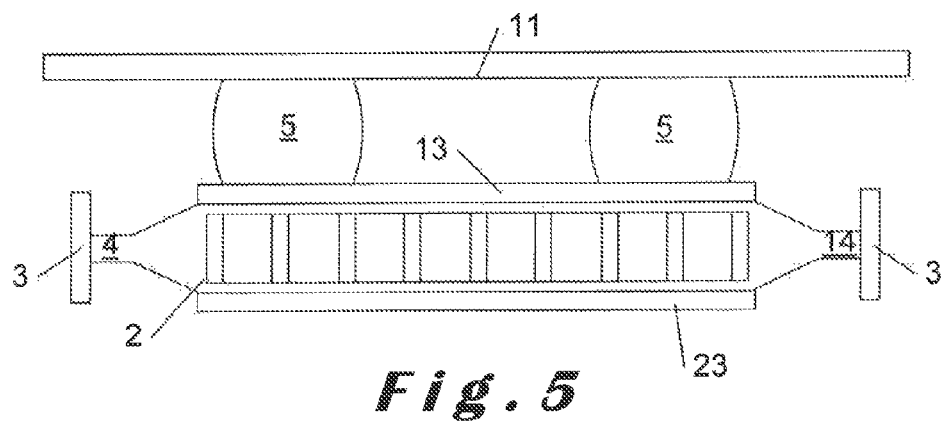
FIG. 5 schematically shows a cross section of the trailer of the present invention in cross direction thereof, at the position of the axles, comprising a honeycomb laminate construction.

As can be seen from FIG. 2, opposite end parts 4, 14 of each axle 2, 12, 22 provide a connection for suspending the wheels. Each wheel 3 is provided with at least one brake system 6. The brake system may be any system considered suitable by the person skilled in the art, but is preferably a disk brake system, As can be seen from FIG. 3 the disk brake comprises a disk 20, and the wheel comprises a wheel rim 28 which is preferably made in one part with the disk, as this provides an economically favourable solution.

The brake system comprises brake parts 16 which engage the wheel upon activation of the brake to create friction and cause braking. For example the wheel engaging brake parts 16 comprise at least one upper and lower claw which are provided to engage opposite parts of the disk 20 upon braking. To provide optimum absorption of the forces experienced by the wheels upon braking, the wheel engaging brake parts 16 are connected to a connecting device 26 which connects the wheel engaging brake part 16 to the upper and lower face 19, 29 of the lower load absorbing surface along a connection area 24 which extends in longitudinal direction of the lower load absorbing surface 21. This way an optimum transfer of forces sensed by the wheels in the course of braking towards the remainder of the trailer may take place and absorption of these forces within the composite material of the load absorbing surfaces 21 and 11 of the trailer is guaranteed. The connecting device 26 may be any device considered suitable by the person skilled in the art. A suitable example is a block made of fibrous reinforced composite material, which extends in longitudinal direction of the lower load absorbing surface 21. In that case for example the bottom face 27 of the block may be connected to the upper face of the lower load absorbing surface 21.

Within the trailer of the present invention optimum transfer of locally occurring forces to a larger part of the trailer is provided. The result is that the risk to local absorption of locally occurring forces, which often results in local material deformation, is minimized. Instead thereof, locally occurring forces are spread over by a much large surface area and are absorbed within the material of the trailer itself. This way the occurrence of breaking connections between parts of the trailer and deformation of parts is minimized. The present invention in fact provides an all composite trailer in which the load carrying surface as well as the undercarriage carrying the wheels, and the suspension connecting the load carrying surface and the undercarriage are all made of composite material and are connected to each other. Thus an all composite trailer is provided, in which the constituting parts act together as one unity. Although the weight of the trailer is significantly reduced as compared to existing systems containing metal parts, the load carrying capacity is increased and the road stability is improved, at minimum risk to breaking of parts during use.

What is claimed:

1. A trailer comprising a trailer bed and at least one axle which extends in cross direction of the trailer and is connected to the trailer bed for suspending the wheels,
   characterized in that
   the trailer bed comprises an upper and a lower load absorbing surface, wherein at least one of the upper and lower load absorbing surface comprises a composite material,
   wherein the upper load absorbing surface comprises in longitudinal direction a front and a back area and at least one connection area between the front and back area, the upper load absorbing surface being connected to the lower load absorbing surface at the position of the at least one connection area,
   wherein the lower load absorbing surface comprises in longitudinal direction
   a first part in a front area of the lower load absorbing surface, which is connected with a first end part to the upper load absorbing surface at the position of the at least one connection area and which slants from the connection towards the back area,
   wherein the lower load absorbing surface further comprises a second part which extends from the first part and runs along the upper load absorbing surface and extends towards the back area thereof
   wherein the second part of the lower load absorbing surface is connected to the upper load absorbing surface on at least one connection position
   wherein at least one axle is connected to the lower load absorbing surface,
   opposite end parts of the axle extending from the lower load absorbing surface in cross direction thereof and providing a connection for suspending a wheel;
   characterized in that between the upper and lower load absorbing surface, at least one reinforcing member is mounted which is resilient and which is provided to function as a support for the upper load absorbing surface in a loaded state of the upper load absorbing surface.

2. A trailer as claimed in claim 1, characterized in that the second part is connected to the upper load absorbing surface at a position which corresponds to the back area of the upper load absorbing surface, by means of a connection part which slants with respect to the upper load absorbing surface.

3. A trailer as claimed in claim 1, characterized in that at least one of the upper and lower load absorbing surface comprise at least one composite laminate which comprises at least an upper and a lower layer of fibrous reinforcing material which sandwich between them at least one layer of a foamed material, the upper and lower layer of fibrous reinforcing material and the foamed material being connected to each other by means of fibres which extend in height direction of the laminate, the laminate being impregnated with a resin.

4. A trailer as claimed in claim 3, characterized in that as the foamed material is made of a material selected from the group of a polymer foam and a honeycomb material or a combination of these materials.

5. A trailer as claimed in claim 1, characterized in that the lower load absorbing surface comprises a lower and upper laminate which sandwich between them a honeycomb material, each of the upper and lower laminate comprising at least one upper and lower layer of fibrous reinforcing material which sandwich between them at least one layer of a polymer foam, the at least one upper and lower layer of fibrous reinforcing material and polymer foam being connected to each other by means of a fibrous reinforcing material which extends in height direction of the laminate, the laminate being impregnated with a resin.

6. A trailer as claimed in claim 1, characterized in that the at least one axle is made of composite material, in that the at least one axle is received within the material of the lower load absorbing surface, between the upper and lower laminate, and is connected thereto.

7. A trailer as claimed in claim 1, characterized in that the at least one reinforcing member is a member made of composite material which is received within the space between the upper and lower load absorbing surface, in that the opposite end parts of the reinforcing member are fastened to the lower load absorbing surface, a part of the reinforcing member between the opposite end parts being resilient in height direction of the trailer bed and being provided to support the upper load absorbing surface in a loaded state thereof.

8. A trailer as claimed in claim 1, characterized in that the at least one reinforcing member comprises a plurality of spacers positioned spaced apart from each other in longitudinal direction of the trailer bed, in that the spacers are reversibly compressible and expandable in height direction of the trailer bed and in that the spacers are mounted at a position corresponding to the position of the axles.

9. A trailer as claimed in claim 8, characterized in that the at least one spacer is a cylinder made of composite material.

10. A trailer as claimed in claim 9, characterized in that the at least one spacer is an air bellows.

11. A trailer as claimed in claim 1, characterized in that each wheel is provided with at least one brake system, comprising brake parts which engage the wheel upon activation of the brake to create friction and cause braking, which brake parts are connected to a connecting device connecting the brake parts to an upper and lower face of the lower load absorbing surface along a connection area.

12. A trailer as claimed in claim 11, characterized in that the connection area extends in longitudinal and transverse direction of the lower load absorbing surface.

13. A trailer as claimed in claim 12, characterized in that the connecting device is made of fibrous reinforced composite material.

14. A trailer as claimed in claim 12, characterized in that as a brake system use is made of a disk brake comprising a disk, in that the wheel comprises a wheel rim which is made in one part with the disk, in that the brake parts comprise at least one upper and lower claw which are provided to engage opposite parts of the disk upon braking in height direction of the wheel, and in that the connecting device comprises a block shaped member made of a fibrous reinforced composite material.

\* \* \* \* \*